United States Patent
Beck

(10) Patent No.: US 7,688,366 B2
(45) Date of Patent: Mar. 30, 2010

(54) METHOD AND APPARATUS FOR SUPPRESSING NOISE IN IMAGE SENSOR DEVICES

(75) Inventor: Jeffery Steven Beck, Philomath, OR (US)

(73) Assignee: Aptina Imaging Corporation, Grand Cayman (KY)

( * ) Notice: Subject to any disclaimer, the term of this patent is extended or adjusted under 35 U.S.C. 154(b) by 688 days.

(21) Appl. No.: 11/470,657

(22) Filed: Sep. 7, 2006

(65) Prior Publication Data

US 2008/0062286 A1    Mar. 13, 2008

(51) Int. Cl.
H04N 5/217    (2006.01)
(52) U.S. Cl. ..................................................... 348/241
(58) Field of Classification Search ............... 348/241, 348/242, 243, 248, 251
See application file for complete search history.

(56) References Cited

U.S. PATENT DOCUMENTS

| | | | |
|---|---|---|---|
| 5,572,155 A | | 11/1996 | Tamayama |
| 5,946,033 A | | 8/1999 | Mooney et al. |
| 6,011,251 A | | 1/2000 | Dierickx et al. |
| 6,166,768 A | | 12/2000 | Fossum et al. |
| 6,303,923 B1 | * | 10/2001 | Wadsworth et al. ... 250/214 LA |
| 6,850,278 B1 | * | 2/2005 | Sakurai et al. .............. 348/302 |
| 6,853,241 B2 | * | 2/2005 | Fujimoto ........................ 330/9 |
| 7,154,075 B2 | * | 12/2006 | Krymski .................. 250/208.1 |
| 7,274,009 B2 | * | 9/2007 | Huang et al. ............. 250/208.1 |
| 7,324,144 B1 | * | 1/2008 | Koizumi ..................... 348/294 |
| 7,453,986 B1 | * | 11/2008 | Isaksen ......................... 378/98 |
| 2003/0035499 A1 | * | 2/2003 | Staszewski et al. ......... 375/346 |
| 2005/0103977 A1 | * | 5/2005 | Krymski .................. 250/208.1 |
| 2005/0206752 A1 | * | 9/2005 | Lim ............................ 348/241 |
| 2006/0239079 A1 | * | 10/2006 | Mokhlesi et al. ....... 365/185.18 |

OTHER PUBLICATIONS

Alan Hoffman et al., "CMOS Detector Technology", Experimental Astronomy, vol. 19, No. 1-3, Jun. 29, 2006, pp. 111-134.
Yavuz Degerli et al., "Analysis and Reduction of Signal Readout Circuitry Temporal Noise in CMOS Image Sensors for Low-Light Levels", IEEE Transactions on Electron Devices, vol. 47, No. 5, May 2000, pp. 949-962.
Hassan Belahrach et al., "Noise Characterisation in CMOS APS Imagers for Highly Integrated Imaging Systems", The 13th International Conference on Microelectronics, Oct. 29, 2001, pp. 31-34.
International Search Report, Appln. No. PCT/US2007/018156, dated Apr. 17, 2008.

* cited by examiner

Primary Examiner—Lin Ye
Assistant Examiner—Chriss S Yoder, III
(74) Attorney, Agent, or Firm—RatnerPrestia

(57) ABSTRACT

An analog sampling circuit comprising a plurality of capacitors is used to sample the reset and video sampling levels at different instants in time to obtain a plurality of respective reset sampling values and a plurality of respective video sampling values. The reset sampling values are then averaged to obtain an average reset sampling value. Likewise, the video sampling values are averaged to obtain an average video sampling value. By averaging the reset sampling values and the video sampling values over time in this manner, random telegraph noise in the reset and video sampling values is eliminated or at least substantially reduced.

10 Claims, 5 Drawing Sheets

METHOD AND APPARATUS FOR SUPPRESSING NOISE IN IMAGE SENSOR DEVICES

TECHNICAL FIELD OF THE INVENTION

The present invention relates to image sensor devices formed in integrated circuits (ICs). More particularly, the invention relates to suppressing noise in the video and reset sample values obtained when sampling an IC image sensor device.

BACKGROUND OF THE INVENTION

Image sensor devices contained in ICs are made up of arrays of pixels. Each pixel comprises a plurality of transistors that function as gates, signal control lines that control the operations of the pixel through switching of the gates, and a photodiode that receives light and produces electrical signals in response to the received light. FIG. 1 illustrates a schematic diagram of a known pixel 2 that has four transistors 3-6, reset (RST), Transfer (TX) and Row control lines 7, 8 and 9, and a photodiode 11. This pixel 2 is a four-transistor (4-T) buried gated photodiode device commonly referred to as a 4-T pinned photodiode pixel. External to the pixel 2 is an analog readout column line 12, a current source 13, a reset sampling switch 14 controlled by reset sampling signal S1, a capacitor C 15, a video sampling switch 16 controlled by video sampling signal S2, and a capacitor C 17. The reset sampling switch 14 connects and disconnects capacitor C 15 to and from the readout column line 12. Likewise, the video sampling switch 16 connects and disconnects capacitor C 17 to and from the readout column line 12.

FIG. 2 illustrates a timing diagram that demonstrates the operations of the pixel 2 during sampling of the reset and video sample values. To sample the pixel 2, the Row control signal 9 is asserted high. When the reset sampling signal S1 goes high, switch 14 is closed connecting the capacitor C 15 to the analog readout column line 12. The RST control signal 7 then goes high. The TX control signal 8 and the video sampling signal S2 are both low at this time. When the RST control signal 7 is high, the RST transistor 3 is on and the floating diffusion (FD) node 18 is connected to the power supply, $V_{DD}$, which turns on the source follower (SF) transistor 4 and causes a buffered voltage corresponding to the voltage on the FD node 18 to be driven onto the analog readout column line 12. When the reset sampling signal S1 goes low, switch S1 14 opens and stores the value of the analog readout column line 12 on the reset storage capacitor C 15. This value is the reset sampling value of the pixel 2.

After reset sampling signal S1 goes low, the video sampling signal S2 goes high. When the video sampling signal S2 goes high, switch 16 is closed connecting the capacitor C 17 to the analog readout column line 12. The TX control signal 8 then goes high. The RST control signal 7 and the reset sampling signal S1 are both low at this time. When the TX control signal 8 goes high, the TX transistor 5 is turned on, connecting the photodiode 11 to the FD node 18. Charge that had been previously integrated on the photodiode 11 due to light is transferred to the FD node 18 at this time. The SF transistor 4 is turned on. This causes the video sampling value, which corresponds to the value of the voltage on the FD node 18 at this time, to be driven onto the analog readout column line 12. When video sampling signal S2 goes low, switch S2 16 opens and stores the value of the analog readout column line 12 on the video storage capacitor C17. This value is the video sampling value of the pixel 2.

On the falling edge of the reset sampling signal S1 (indicated by dashed line 19), the reset sampling value stored on capacitor C 15 is sampled by sampling circuitry (not shown) and converted from an analog reset sampling value to a digital reset sampling value. Likewise, on the falling edge of the video sampling signal S2 (indicated by dashed line 21), the video sampling value stored on capacitor C 17 is sampled by sampling circuitry (not shown) and converted from an analog video sampling value to a digital video sampling value. The difference between the digital reset and video sampling values is then obtained, and this difference value corresponds to the pixel sample value.

In the image sensor industry, efforts are continuously being made to reduce the amount of area consumed by the transistors, signal control lines and readout circuitry of the pixels. At the same time, efforts are also being made to increase the photodiode area. As the area of the SF transistor in the pixel decreases, temporal fluctuations in the threshold voltage of the SF transistor increase. Because of the temporal variation in the threshold voltage of the SF transistor, the threshold voltage may not be the same when the reset sampling value and the video sampling value are taken. The temporal variation in threshold voltage of each pixel results in random noise in the reset and video sampling values, which, of course, is undesirable. This type of noise is sometimes referred to in the image sensor industry as random telegraph noise. In addition, as the transistors are made increasingly smaller, the differences between the threshold voltages that can exist when the reset sampling value and the video sampling value are taken also increase, which increases the amount of telegraph noise contained in the reset and video sampling values.

Currently, the only practical solution for reducing random telegraph noise is to increase the size of the SF transistor. Increasing the size of the SF transistor, however, increases the overall size of the pixel, which is undesirable. In addition, increasing the size of the SF transistor also decreases the fill factor (i.e., the amount of area that is available for implementing the photodiode), which also is undesirable.

Accordingly, a need exists for a way to eliminate or reduce random telegraph noise in image sensor devices. A need also exists for a way to eliminate or reduce random telegraph noise in image sensor devices without having to increase the size of the SF transistor and without having to reduce the pixel fill factor.

SUMMARY OF THE INVENTION

The invention provides a method and an apparatus for reducing or eliminating noise in an image sensor device formed in an IC. The apparatus comprises an analog sampling circuit electrically connected to an output of a pixel. The analog sampling circuit obtains an average reset sampling value and an average video sampling value. The analog sampling circuit obtains the average reset sampling value by sampling a reset sampling level on the pixel output at different instants in time during a reset sampling phase to obtain a plurality of respective reset sampling values, and averaging the plurality of reset sampling values to produce the average reset sampling value. The analog sampling circuit obtains the average video sampling value by sampling a video sampling level on the pixel output at different instants in time during a video sampling phase to obtain a plurality of respective video sampling values, and averaging the plurality of video sampling values to produce the average video sampling value.

The method comprises sampling a reset sampling level on an output of a pixel at different instants in time during a reset sampling phase to obtain a plurality of respective reset sampling values, averaging the plurality of reset sampling values to produce an average reset sampling value, sampling a video sampling level on the output of the pixel at different instants in time during a video sampling phase to obtain a plurality of respective video sampling values, and averaging the plurality of video sampling values to produce an average video sampling value.

These and other features and advantages of the invention will become apparent from the following description, drawings and claims.

DETAILED DESCRIPTION OF AN EXEMPLARY EMBODIMENT

In accordance with the invention, an analog sampling circuit comprising a plurality of capacitors is used to sample the reset and video sampling levels at different instants in time to obtain average reset and video sampling values. By averaging the reset and video sampling levels over time, random telegraph noise in the reset and video sampling values is eliminated or at least substantially reduced.

Figure 3:
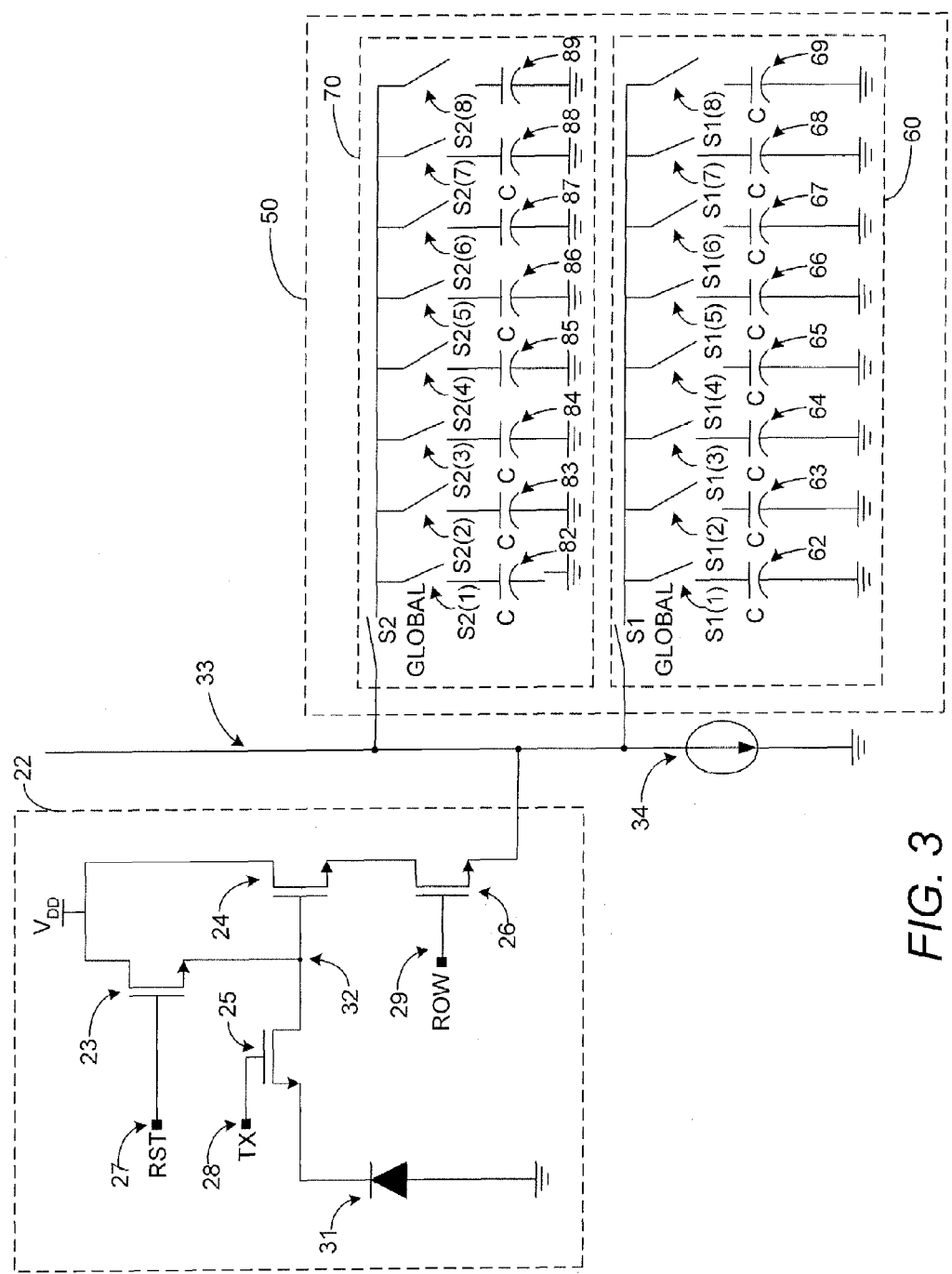
FIG. 3 illustrates a schematic diagram of a pixel that uses the analog sampling circuit of the invention to reduce or eliminate random telegraph noise.

FIG. 3 illustrates a schematic diagram of a pixel 22 having an output that is connected to an analog sampling circuit 50 of the invention. The analog sampling circuit 50 comprises a reset sampling circuit 60 and a video sampling circuit 70. In accordance with this exemplary embodiment, eight capacitors 62-69 are used in the reset sampling circuit 60 to sample the reset sampling level of the pixel 22 over respective timing intervals during the reset sampling period. These reset sampling values are then averaged to produce a reduced-noise reset sampling value, i.e., a reset sampling value from which random telegraph noise has been removed. Likewise, eight capacitors 82-89 are used in the video sampling circuit 70 to sample the video sampling level of the pixel 22 over respective timing intervals during the video sampling period. These video sampling values are then averaged to produce a reduced-noise video sampling value.

The reset sampling circuit 60 employs a switching configuration comprising switches S1 Global and switches S1(1)-S1(8). The video sampling circuit 70 employs a switching configuration comprising switches S2 Global and switches S2(1)-S2(8). The components 23, 24, 25, 26, 27, 28, 29 and 31 of the pixel 22 may be identical to the components 3, 4, 5, 6, 7, 8, 9 and 11 of the pixel 2 shown in FIG. 1. The analog readout column line 33 and the current source 34 shown in FIG. 3 may be identical to the analog readout column line 12 and the current source 13 shown in FIG. 1.

Figure 1:
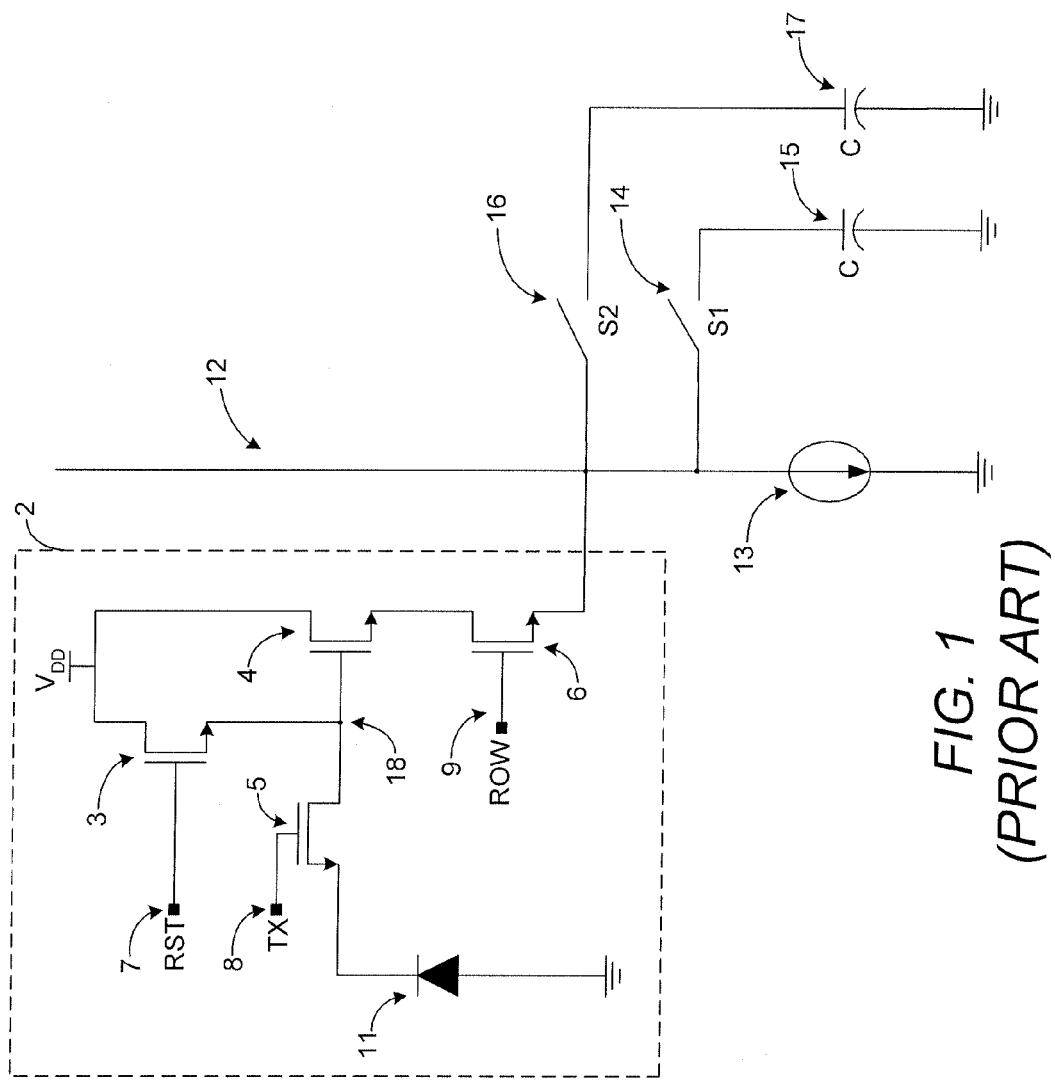
FIG. 1 illustrates a schematic diagram of a known four-transistor (4-T) buried gated photodiode device commonly referred to as a 4-T pinned photodiode pixel.
Figure 2:
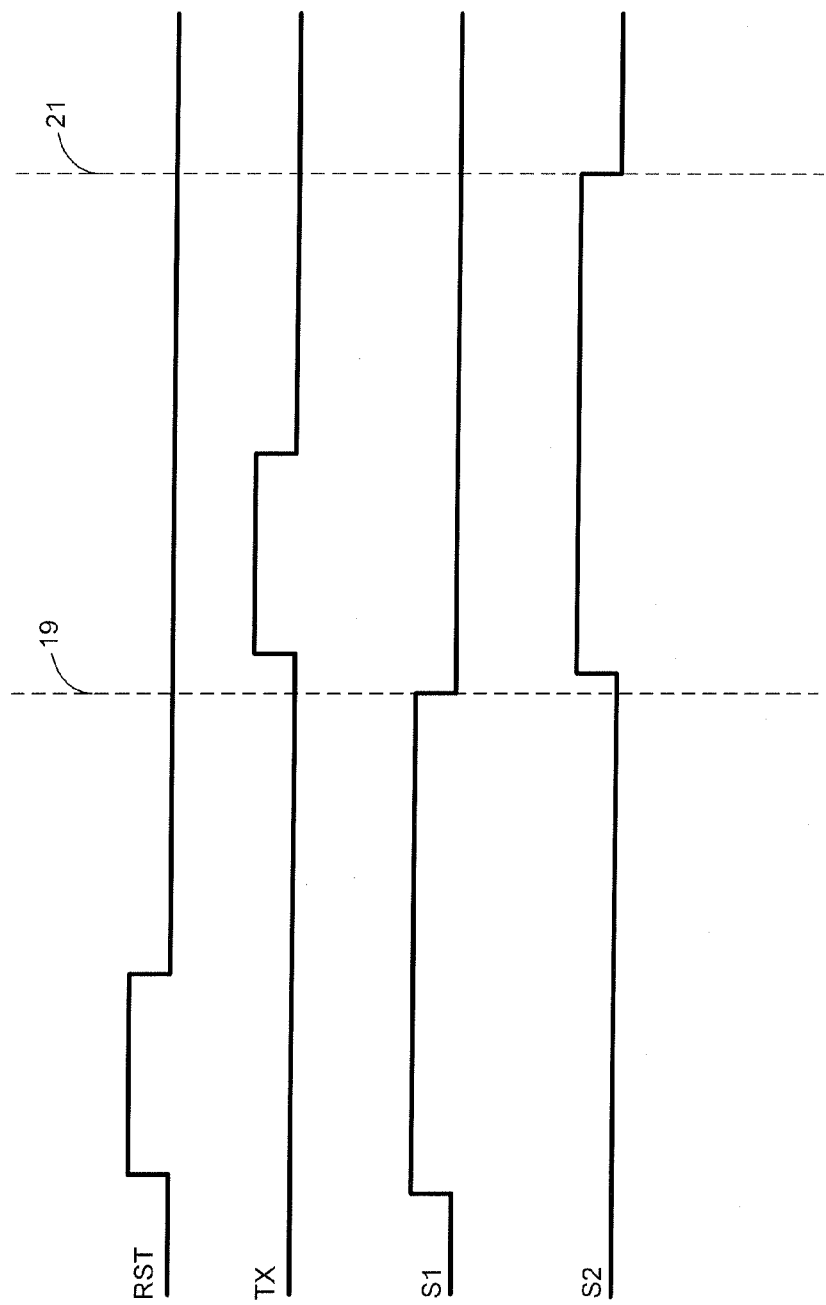
FIG. 2 illustrates a timing diagram that demonstrates the timing of events during operations of the pixel shown in FIG. 1.

As stated above, the pixel 2 shown in FIG. 1 is a 4-T buried gated photodiode device. While the invention is suitable for use with this type of photodiode device, the invention is not limited with respect to the type of photodiode device with which the invention is implemented. The invention is being described with reference to a 4-T buried gated photodiode device for exemplary purposes and to demonstrate the principles and concepts of the invention.

Figure 4:
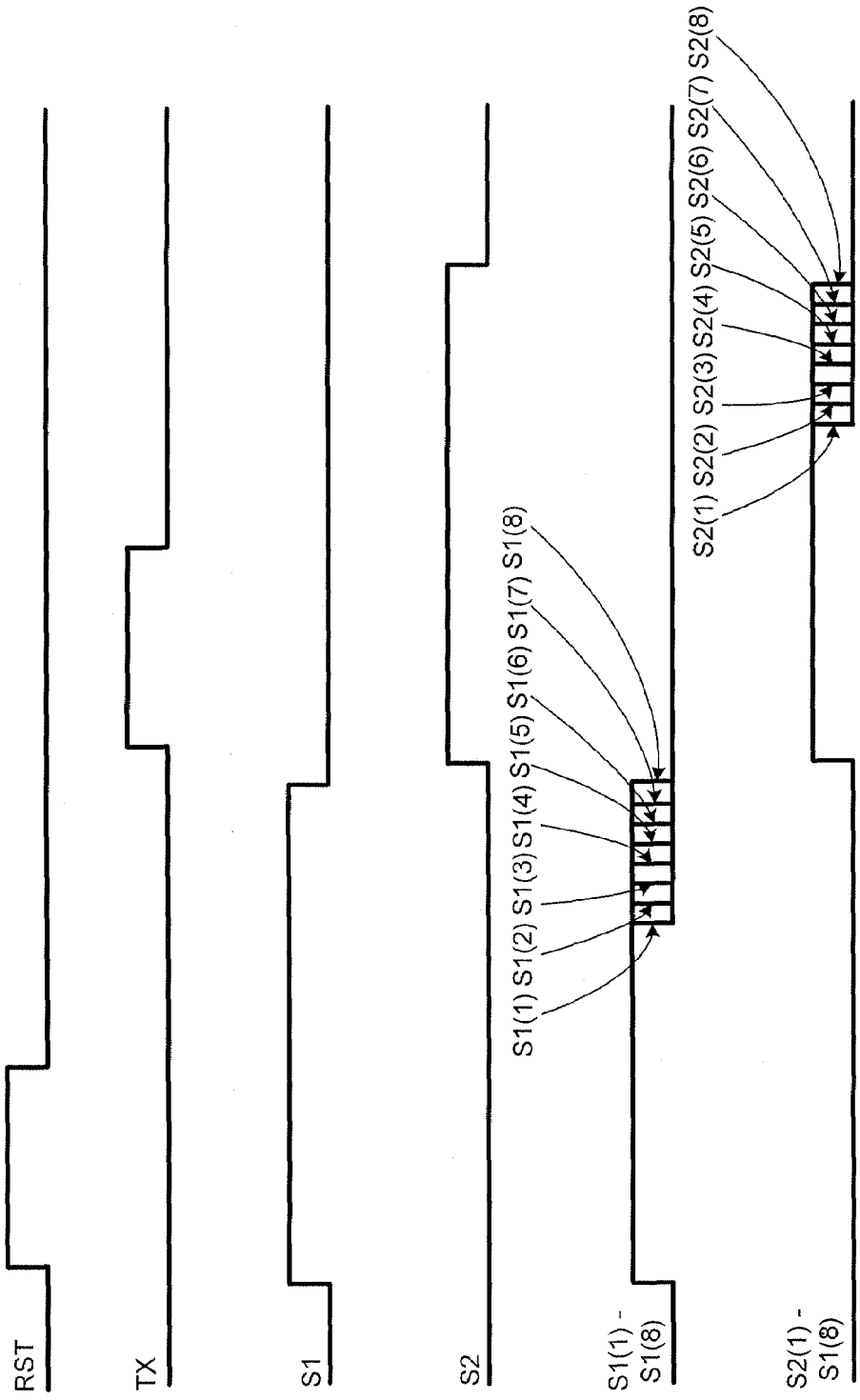
FIG. 4 illustrates a timing diagram that demonstrates the timing of events during operations of the pixel shown in FIG. 3.

The manner in which the pixel 22 and analog sampling circuit 50 operate will now be described with reference to FIG. 3 and with reference to the timing diagram shown in FIG. 4. To sample the pixel 22, the Row control signal 29 is asserted high. When the reset sampling signal S1 Global goes high, S1 Global switch is closed. When S1 Global goes high, all of the individual S1 sampling signals S1(1)-S1(8) also go high, causing all of the switches S1(1)-S1(8) to close. The RST control signal 27 goes high just after the signals S1 Global and S1(1)-S1(8) go high. The TX control signal 28 and the video sampling signals S2 Global and S2(1)-S2(8) are all low at this time. When the RST control signal 27 is high, the RST transistor 23 is on and the FD node 32 is connected to the power supply, $V_{DD}$, which turns on the source follower (SF) transistor 24 and causes a buffered voltage corresponding to the voltage on the FD node 32 to be driven onto the analog readout column line 33. The capacitors 62-69 are then disconnected by opening the S1(1)-S1(8) switches one at a time, as indicated in the timing diagram by the S1(1)-S1(8) signals going low one at a time. Thus, each of the capacitors 62-69 samples the reset sampling value from the analog readout column line 33 over a respective timing interval during the reset sampling period. Subsequent to this sampling sequence, the global switch S1 GLOBAL is opened and all of the S1(1)-S1(8) switches are closed simultaneously (not shown), thereby causing the values stored on the capacitors 62-69 to be redistributed such that each capacitor has an average reset sampling value stored on it. This average reset sampling value contains a reduced level of random telegraph noise and is subsequently used by circuitry downstream (not shown) to obtain the difference between the average reset and average video sampling values.

After reset sampling signals S1 Global and S1(1)-S1(8) go low, the video sampling signals S2 Global and S2(1)-S2(8) go high, causing the S2 Global switch and the S2(1)-S2(8) switches to close. The TX control signal 28 then goes high. The RST control signal 27 and the reset sampling signals S1 Global and S1(1)-S1(8) are all low at this time. When the TX control signal 28 goes high, the TX transistor 25 is turned on, connecting the photodiode 31 to the FD node 32. Charge that had been previously integrated on the photodiode 31 due to light is transferred to the FD node 32 at this time. The SF transistor 24 is turned on, causing the video sampling value, which corresponds to the value of the voltage on the FD node 32 at this time, to be driven onto the analog readout column line 33. The capacitors 82-89 are then disconnected one at a time by opening the S2(1)-S2(8) switches one at a time, as indicated in the timing diagram by the S2(1)-S2(8) signals going low one after the other. Thus, each of the capacitors 82-89 samples the video sampling value over a respective timing interval during the video sampling period. Subsequent to this sampling process, the global switch S2 Global is opened and all of the S2(1)-S2(8) switches are closed simultaneously (not shown), thereby causing the values stored on the capacitors 82-89 to be redistributed such that each capacitor has an average video sampling value stored on it. This average video sampling value has a reduced level of random telegraph noise and is subsequently used by circuitry downstream (not shown) to obtain the difference between the average reset and average video sampling values.

In FIG. 3, the analog sampling circuit 50 is shown as having eight reset sampling capacitors 62-69 and eight video sampling capacitors 82-89. The invention is not limited to the configuration shown. Any configuration that is capable of sampling the reset and video levels over time and averaging the sampling values to obtain average reset and video sampling values is suitable for achieving the goals of the invention. One of the advantages of the configuration of the analog sampling circuit 50 shown in FIG. 3 is that it generally requires the same amount of area on the IC as that required by the components 14-17 shown in FIG. 1. This is because each of the capacitors 62-69 consumes only one eighth of the amount of space consumed by the capacitor 15, i.e., all of the capacitors 62-69 combined consume the same amount of area as that consumed by the single capacitor 15. Likewise, each of the capacitors 82-89 consumes only one eighth of the amount of space consumed by the capacitor 17, i.e., all of the capacitors 82-89 combined consume the same amount of area as that consumed by the single capacitor 17. Consequently, the invention provides a solution for eliminating or at least substantially reducing random telegraph noise that does not increase the overall size of the image sensor device and does not reduce the fill factor of the image sensor device.

Figure 5:
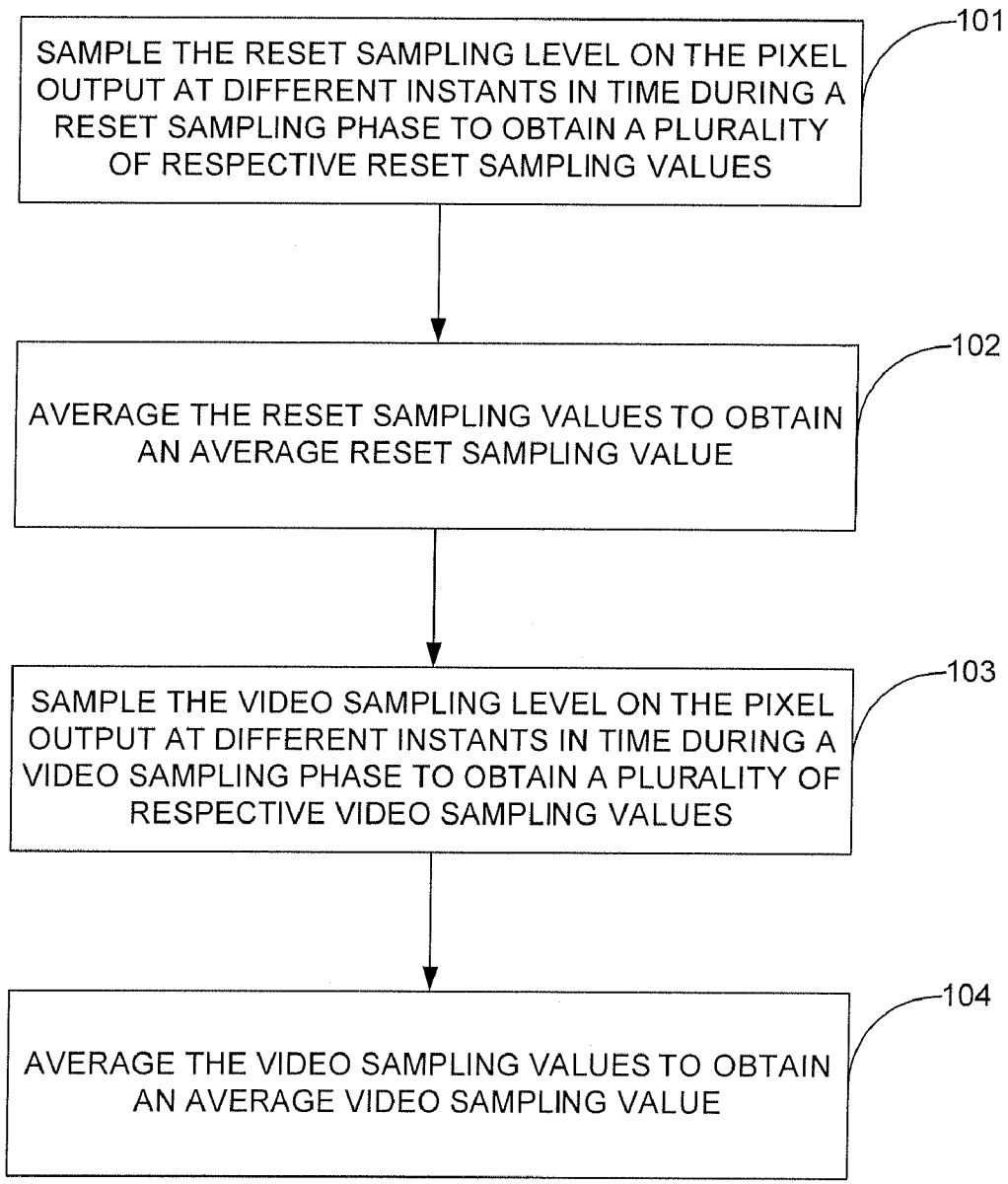
FIG. 5 illustrates a flowchart that represents the method of the invention in accordance with an exemplary embodiment.

FIG. 5 illustrates a flowchart that demonstrates the method of the invention in accordance with an exemplary embodiment. A reset sampling level on an output of a pixel is sampled at different instants in time during a reset sampling phase to obtain a plurality of respective reset sampling values, as indicated by block 101. The reset sampling values are averaged to produce an average reset sampling value, as indicated by block 102. A video sampling level on the output of the pixel is sampled at different instants in time during a video sampling phase to obtain a plurality of respective video sampling values, as indicated by block 103. The video sampling values are averaged to produce an average video sampling value, as indicated by block 104. It should be noted that the invention is not limited with respect to the order in which the steps represented by blocks 101-104 are performed. For example, the steps represented by blocks 103 and 104 may be performed before the steps represented by blocks 101 and 102 are performed.

It should be noted that the invention has been described with reference to a few example embodiments and that the present invention is not limited to these embodiments. The embodiments described herein are meant to convey the principles and concepts of the present invention and are not intended to demonstrate exclusive embodiments for carrying out the invention. For example, the invention is not limited to the particular configuration shown in FIG. 3 or to the timing of events represented by the timing diagram shown in FIG. 4. Other modifications may be made to the embodiments described herein and all such modifications are within the scope of the present invention.

What is claimed is:

1. An apparatus for reducing or eliminating noise in an image sensor device formed in an integrated circuit (IC), the apparatus comprising:
   an analog sampling circuit electrically connected to an output of a pixel, the analog sampling circuit obtaining an average reset sampling value and an average video sampling value, wherein:
   the analog sampling circuit obtains the average reset sampling value by sampling a reset sampling level on the pixel output during a first set of overlapping periods of time during a reset sampling phase to obtain a plurality of respective reset sampling values and averaging the plurality of reset sampling values to produce the average reset sampling value,
   the analog sampling circuit obtains the average video sampling value by sampling a video sampling level on the pixel output during a second set of overlapping periods of time during a video sampling phase to obtain a plurality of respective video sampling values and averaging the plurality of video sampling values to produce the average video sampling value, and
   the analog sampling circuit comprises:
   a reset sampling circuit, the reset sampling circuit having at least first and second reset sampling capacitors that sample the reset sampling level on the pixel output during a reset sampling timing interval, the reset sampling circuit having a reset sampling switching configuration, the reset sampling switching configuration electrically connecting the first and second reset sampling capacitors to the pixel output during the reset sampling timing interval, the reset sampling switching configuration electrically disconnecting the first and second reset sampling capacitors from the pixel output at respectively different instants in time, wherein connecting the reset sampling capacitors to the pixel output causes electrical charges corresponding to the respective reset sampling values to be stored on the respective reset sampling capacitors; and
   a video sampling circuit, the video sampling circuit having at least first and second video sampling capacitors that sample the video sampling level on the pixel output during a video sampling timing interval, the video sampling circuit having a video sampling switching configuration, the video sampling switching configuration electrically connecting the first and second video sampling capacitors to the pixel output during the video sampling timing interval, the video sampling switching configuration electrically disconnecting the first and second video sampling capacitors from the pixel output at respectively different instants in time, wherein connecting the video sampling capacitors to the pixel output causes an electrical charge corresponding to the respective video sampling values to be stored on the respective video sampling capacitors.

2. The apparatus of claim 1, wherein after the first and second reset sampling capacitors have been disconnected from the pixel output, the reset sampling switching configuration re-connects the first and second reset sampling capacitors to each other to thereby cause the electrical charges that are stored on the reset sampling capacitors to be re-distributed such that the electrical charge that is stored on each of the reset sampling capacitors corresponds to the average reset sampling value, and wherein after the first and second video sampling capacitors have been disconnected from the pixel output, the video sampling switching configuration re-connects the first and second video sampling capacitors to each other to thereby cause the electrical charges that are stored on the video sampling capacitors to be re-distributed such that the electrical charge that is stored on each of the video sampling capacitors corresponds to the average video sampling value.

3. The apparatus of claim 1, further comprising:
   a plurality of said analog sampling circuits, each respective analog sampling circuit being electrically connected to an output of a respective pixel of the image sensor device, each respective analog sampling circuit obtaining an average reset sampling value and an average video sampling value for the respective pixel to which the analog sampling circuit is connected.

4. The apparatus of claim 3, wherein the pixels are buried gated photodiode device.

5. A method for reducing or eliminating noise in an image sensor device formed in an integrated circuit (IC), the method comprising:
- sampling a reset sampling level on an output of a pixel during overlapping periods of time during a reset sampling phase to obtain a plurality of respective reset sampling values by:
- electrically coupling a first plurality of reset capacitors to a readout column line simultaneously during the reset sampling phase, and
- sequentially decoupling each respective reset capacitor of the plurality of electrically coupled reset capacitors from the readout column line during the reset sampling phase;
- averaging the plurality of reset sampling values to produce an average reset sampling value;
- sampling a video sampling level on the output of the pixel during overlapping periods of time during a video sampling phase to obtain a plurality of respective video sampling values by:
- electrically coupling a second plurality of video capacitors to the readout column line simultaneously during the video sampling phase, and
- sequentially decoupling each respective video capacitor of the plurality of electrically coupled video capacitors from the readout column line during the video sampling phase; and
- averaging the plurality of video sampling values to produce an average video sampling value.

6. The method of claim 5, wherein the sampling of the reset and video sampling levels comprises:
- sampling, from a first reset capacitor of the first plurality of reset capacitor, the reset sampling level on the pixel output during a first reset interval of the reset sampling phase;
- sampling, from a second reset capacitor of the first plurality of reset capacitor, the reset sampling level on the pixel output during a second reset interval of the reset sampling phase, the first and second reset intervals having overlapping periods;

wherein:
the sampling of the first reset capacitor includes:
electrically connecting the first reset capacitor to the pixel output at a start of the first reset interval, and
electrically disconnecting the first reset capacitor from the pixel output at an end of the first reset interval;
the sampling of the second reset capacitor includes:
electrically connecting the second reset capacitor to the pixel output at a start of the second reset interval, and
electrically disconnecting the second reset sampling capacitor from the pixel output at an end of the second reset interval;
sampling, from a first video capacitor of the second plurality of video capacitors, the video sampling level on the pixel output during a first video interval of the video sampling phase;
sampling, from a second video capacitor of the second plurality of video capacitors, the video sampling level on the pixel output during a second video interval of the video sampling phase, the first and second video intervals having overlapping periods;
wherein:
the sampling of the first video capacitor includes:
electrically connecting the first video capacitor to the pixel output at a start of the first video interval, and
electrically disconnecting the first video capacitor from the pixel output at an end of the first video interval;
the sampling of the second video capacitor includes:
electrically connecting the second video capacitor to the pixel output at a start of the second video interval, and
electrically disconnecting the second video capacitor from the pixel output at an end of the second video interval.

7. The method of claim 6, wherein the averaging of the plurality of reset sampling values and the averaging of the plurality of video sampling values comprises:
- after the first and second reset capacitors have been disconnected from the pixel output, connecting the first and second reset capacitors to each other to cause the electrical charges that are stored on the first and second reset capacitors to be re-distributed such that the electrical charge that is stored on each of the first and second reset capacitors corresponds to the average reset sampling value; and
- after the first and second video capacitors have been disconnected from the pixel output, connecting the first and second video capacitors to each other to cause the electrical charges that are stored on the first and second video capacitors to be re-distributed such that the electrical charge that is stored on each of the first and second video capacitors corresponds to the average video sampling value.

8. The method of claim 5, wherein the pixel is a buried gated photodiode device.

9. A circuit for reducing noise of an input signal comprising:
- a sampling circuit coupled between input and output nodes,
- the sampling circuit including at least two capacitors, each selectively coupled to the input node during a first set of overlapping periods, for sampling values of the input signal, and
- an averaging circuit for averaging the sampled values from the at least two capacitors,
- wherein the at least two capacitors are configured to switch coupling states, at different instants of time, to the input node for sampling the values of the input signal, and
- the averaging circuit averages the at least two sampled values for reducing noise at the output node.

10. The circuit of claim 9 wherein
a plurality of capacitors are configured to each successively switch coupling states, at different respective instants of time, from the input node for sampling respectively different durations of the input signal.

* * * * *